United States Patent [19]

Nijs et al.

[11] 4,134,197
[45] Jan. 16, 1979

[54] METHOD OF COATING PIPE WITH CONTINUOUSLY REINFORCED CONCRETE

[75] Inventors: Marc Nijs, Harelbeke; Frits Vanassche, Zwevegem, both of Belgium; Johannes A. De Kok, Hoogezand, Netherlands

[73] Assignee: N. V. Bekaert S. A., Zwevegem, Belgium

[21] Appl. No.: 781,325

[22] Filed: Mar. 25, 1977

Related U.S. Application Data

[62] Division of Ser. No. 614,227, Sep. 17, 1975, Pat. No. 4,033,387.

[30] Foreign Application Priority Data

Sep. 27, 1974 [GB] United Kingdom ............... 42142/74

[51] Int. Cl.² ........................... B23P 3/00; B23P 25/00
[52] U.S. Cl. ...................................... 29/458; 138/175; 140/105; 264/228
[58] Field of Search .................. 29/458, 460; 140/105; 264/228; 138/175

[56] References Cited

U.S. PATENT DOCUMENTS

| 2,717,615 | 9/1955 | Peckworth | 138/175 |
| 2,754,575 | 7/1956 | Bruce | 29/460 |
| 3,761,557 | 9/1973 | Werner | 264/228 |
| 3,871,410 | 3/1975 | Francois | 138/175 |

Primary Examiner—Charlie T. Moon
Attorney, Agent, or Firm—Shlesinger, Arkwright, Garvey & Dinsmore

[57] ABSTRACT

A method of making a metal reinforcing strip suitable for use in reinforcing a coating applied onto a pipe comprising providing a strip of welded wire mesh having longitudinal and transverse wires, and passing the strip between a pair of rollers which deform the longitudinal wires to an extent which increases progressively across the strip.

10 Claims, 3 Drawing Figures

METHOD OF COATING PIPE WITH CONTINUOUSLY REINFORCED CONCRETE

This is a division of application Ser. No. 614,227, filed Sept. 17, 1975, now U.S. Pat. No. 4,033,387.

The invention relates to a method of making a metal reinforcing strip for use in reinforcing a coating applied to a cylindrical object, such as a pipe.

It is sometimes necessary to apply a heavy coating of concrete or the like to pipes for use underwater, for example oil pipelines, to counteract their buoyancy. Such heavy coatings require reinforcement to enable them to withstand the pressures they encounter in use, and the reinforcing is usually provided by embedding metal reinforcing members in the coating.

A concrete coating may be applied to a pipe by rotating the pipe and at the same time moving it axially past a spraying station at which concrete is sprayed on the outer surface of the pipe. Simultaneously with the spraying, a metal reinforcing strip may be wound around the pipe and embedded in the concrete.

As the thickness of the concrete builds up on the pipe in the region of the spraying station it forms a generally frustoconical shape and then a generally cylindrical shape. The reinforcing strip is applied in the frustoconical region and hence one edge of the strip (that nearest the direction in which the rotating pipe is axially moving) must surround a larger circumference than the other edge.

A known form of reinforcing strip for pipe coatings (see for example U.S. Pat. No. 3,761,557) comprises two or more longitudinal wires having spaced-apart rods welded therebetween and wherein one of the longitudinal wires is provided with a degree of slack between each pair of rods to allow it to expand when wrapped around a frustoconical portion of a concrete coating. The manufacture of such a strip is complicated and difficult to achieve automatically because the longitudinal wires must be supported and given the required amount of slack and then the rods must be welded to the correct points of the wires. It is desirable to form a reinforcing strip from welded wire mesh which is readily fabricated automatically.

According to the invention, there is provided a method of making a metal reinforcing strip comprising taking a strip of welded wire mesh having longitudinal wires and transverse wires, and deforming at least some of said longitudinal wires to an extent which increases progressively across the strip.

The longitudinal wires of the welded wire mesh are preferably substantially perpendicular to the transverse wires before deformation, such rectangular wire mesh being relatively easily fabricated and readily available commercially.

The step of deforming at least some of the longitudinal wires may be performed in a single operation by passing the strip of mesh between a pair of rollers arranged to effect the said deformation of the longitudinal wires. Preferably, however, the deforming step is performed in two operations; thus the strip of welded wire mesh may be passed between a pair of rollers arranged to deform to an equal extent all of the longitudinal wires of the mesh and subsequently passed between a pair of rollers arranged to longitudinally expand the mesh to a different extent at different portions of its width. Alternatively, the strip of welded wire mesh may be passed between a pair of rollers arranged to deform to an equal extent all of the longitudinal wires of the mesh and subsequently the mesh may be simply stretched or drawn to longitudinally expand the mesh to a different extent at different portions of its width. The said stretching or drawing may conveniently be carried out as the mesh is wound onto a pipe in a coating operation.

The said longitudinal wires may be deformed so that they are bent but still lie in the plane of the mesh. Preferably, however, they are deformed in respective planes perpendicular to the plane of the mesh. This leads to improved keying with the coating and better reinforcement properties.

The invention also provides a method of coating a pipe comprising the simultaneous steps of rotating the pipe, spraying concrete onto the outer surface of the pipe, and winding onto the pipe a metal reinforcing strip made by the method defined above.

Certain embodiments of the invention will now be described by way of example and with reference to the accompanying drawing, in which.

Figure 1:
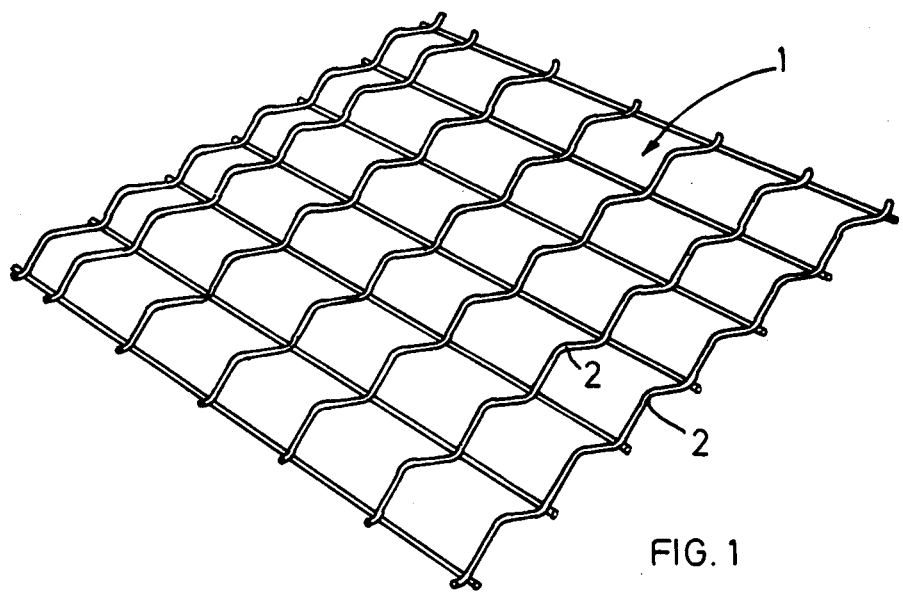
FIG. 1 shows a portion of a strip of welded wire mesh at an intermediate stage of a method according to the invention.
Figure 2:
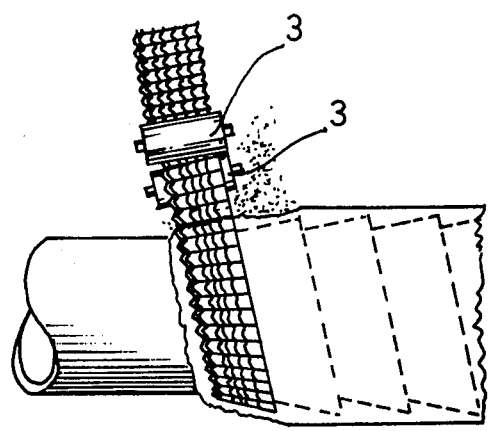
FIG. 2 shows the mesh of FIG. 1 being subjected to a further stage of the method and being wound on a pipe.

Referring now to the drawings, the method employs a strip of conventional welded wire mesh, i.e. a mesh formed by welding straight parallel longitudinal wires to straight parallel transverse wires. The longitudinal wires are preferably substantially perpendicular to the transverse wires. A convenient width of strip is from 150 to 250 mm.

In a first embodiment of the method, all of the longitudinal wires of the mesh are first deformed to the same extent. This can be done by passing the welded wire mesh between a pair of suitably contoured rollers to form the mesh into the shape shown in FIG. 1. As can be seen, the longitudinal wires 2 of the mesh 1 are all deformed to the same extent in respective planes perpendicular to the plane of the mesh.

The uniformly-deformed mesh 1 is then led to a coating station at which it is passed between a pair of rollers 3 having inclined axes. These rollers 3 serve to completely straighten out the deformations in the longitudinal wire at one edge of the strip and to straighten out the deformations in the other longitudinal wires to a progressively lesser extent across the width of the strip.

Figure 3:
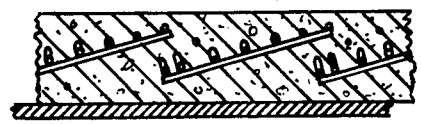
FIG. 3 is a fragmentary longitudinal section of the coated pipe of FIG. 2.

The reinforcing strip may now be wound around a rotating pipe without substantial further deformation, and simultaneously concrete or other suitable coating material may be sprayed onto the outer surface of the pipe. The longitudinal wires with the greater deformations are arranged to lie nearer the surface of the pipe as can be seen in FIG. 3, and the decreasing extent of the deformations away from the surface of the pipe leads to good adhesion between the coating material and the reinforcing strip.

As shown in the drawings, the longitudinal wires which are to lie nearest the surface of the pipe may be formed closer together in the wire mesh than the other longitudinal area. This then prevents the deformations in these longitudinal wires from being drawn out as the strip is wound onto the pipe. Alternatively, the longitudinal wire which is to be wound closest to the pipe surface could be stronger, as by making it of larger diameter than the other longitudinal wires or of square cross-section but similar dimensions.

According to an alternative embodiment of the invention, the uniformly-deformed mesh 1 may be stretched or drawn to straighten out the deformations in the longitudinal wires to a progressively lesser extent across the width of the strip. This may be done by omitting the rollers 3 and allowing the rotating pipe to draw the wire mesh against a braking force applied to the spool from which the uniformly deformed mesh is fed or to the rollers which uniformly deform the mesh.

In another embodiment of the invention, the deformation of the longitudinal wires may be performed in a single operation by passing the strip between a single pair of rollers arranged so that the wire to be laid nearest the surface of the pipe receives the greatest deformation, while the wire at the other edge of the strip receives no or very little deformation, the amount of deformation increasing progressively across the strip.

We claim:

1. A method of coating a pipe comprising the simultaneous steps of rotating the pipe and moving it axially past a spraying station spraying concrete onto the outer surface of the pipe and winding onto the pipe a welded wire mesh comprising a plurality of longitudinal wires and a plurality of spaced-apart transverse wires welded to said longitudinal wires, the length of longitudinal wire between adjacent ones of at least some of said transverse wires being provided with a uniform degree of slack across the width of said strip, and stretching said mesh by means of the rotating pipe to longitudinally expand the mesh to the extent that the slack varies progressively across the width of said strip and one longitudinal side of the mesh forms a larger diameter than the other longitudinal side thereof.

2. A method of coating a pipe comprising the simultaneous steps of rotating the pipe and moving it axially past a spraying station spraying concrete onto the outer surface of the pipe, guiding towards the pipe a welded wire mesh comprising a plurality of longitudinal wires and a plurality of spaced apart transverse wires welded to said longitudinal wires, the length of said longitudinal wires between adjacent transverse wires being substantially straight across the width of said strip, providing said longitudinal wires between adjacent ones of at least some of said transverse wires with a uniform degree of slack across the width of said strip by deforming said longitudinal wires, and stretching said mesh by means of the rotating pipe to longitudinally expand the mesh to the extent that the slack varies progressively across the width of said strip and one longitudinal side of the mesh forms a larger diameter than the other longitudinal side thereof.

3. A method of coating pipe comprising providing a welded wire mesh having a plurality of longitudinal wires and a plurality of spaced-apart transverse wires welded to said longitudinal wires, the length of longitudinal wire between adjacent transverse wires being substantially uniform across the width of said strip, simultaneously rotating the pipe and moving it axially past a spraying station spraying concrete onto the outer surface of the pipe, deforming at least some of said longitudinal wires to produce a deformation in said at least some of said longitudinal wires which deformation varies progressively across said strip, and winding the welded wire mesh onto the pipe so that one longitudinal side of the mesh forms a larger diameter than the other longitudinal side thereof.

4. A method of coating a pipe as in claim 3 and wherein said longitudinal wires, prior to said deforming step, are substantially perpendicular to said transverse wires.

5. A method of coating a pipe as in claim 3 and wherein said longitudinal wires are substantially straight prior to said deformation step.

6. A method of coating a pipe as in claim 3 and wherein said deforming step is performed in a single operation by passing said welded wire mesh between a pair of rollers arranged to effect said deformation of the longitudinal wires, immediately prior to said winding step.

7. A method of coating a pipe as in claim 3 and wherein the longitudinal wires are deformed in planes substantially perpendicular to the plane of said strip.

8. A method of coating a pipe as in claim 7 and wherein said longitudinal wires are substantially straight prior to said deformation step.

9. A method of coating a pipe as in claim 7 and wherein said longitudinal wires have an undulated configuration in planes which are substantially perpendicular to the plane of said strip prior to said deformation step.

10. A method of coating a pipe as in claim 9 wherein said deforming step is performed as said welded wire mesh is being wound onto said pipe.

* * * * *